United States Patent [19]

Balasubramanian

[11] 4,225,240
[45] Sep. 30, 1980

[54] METHOD AND SYSTEM FOR DETERMINING INTERFEROMETRIC OPTICAL PATH LENGTH DIFFERENCE

[76] Inventor: N. Balasubramanian, 19 Meetinghouse Rd., Acton, Mass. 01720

[21] Appl. No.: 912,212

[22] Filed: Jun. 5, 1978

[51] Int. Cl.$^2$ .............................................. G01B 9/02
[52] U.S. Cl. .................................................... 356/360
[58] Field of Search ............................... 356/359, 360

[56] References Cited

U.S. PATENT DOCUMENTS

| | | | |
|---|---|---|---|
| 3,694,088 | 9/1972 | Gallagher et al. | 356/351 |
| 3,950,103 | 4/1976 | Schmidt-Weinmar | 356/359 |
| 4,022,532 | 5/1977 | Montagnino | 356/359 |

Primary Examiner—F. L. Evans
Assistant Examiner—Matthew W. Koren
Attorney, Agent, or Firm—Joseph S. Iandiorio

[57] ABSTRACT

A method and system for determining interferometric optical path length difference including: varying the interferometric optical path length difference between a first and a second surface in three steps at one-quarter wavelength intervals; sensing the intensity of the interferogram radiation at at least one position of the interferogram at each of the steps; storing the intensity sensed at each position at each step; for each of the positions adding the intensity of the first and third steps to produce a d.c. spatial frequency amplitude, subtracting the intensity of the third step from that of the first to obtain the cosinusoidal spatial frequency amplitude, and subtracting the intensity of the second step from the d.c. amplitude to produce the sinusoidal spatial frequency amplitude; combining the sinusoidal and cosinusoidal amplitudes to produce a trigonometric function of the phase angle of the radiation reflected from each position of the first and second surfaces and generating from the trigonometric function of the phase angle an output representative of the optical path length difference at each position.

14 Claims, 9 Drawing Figures

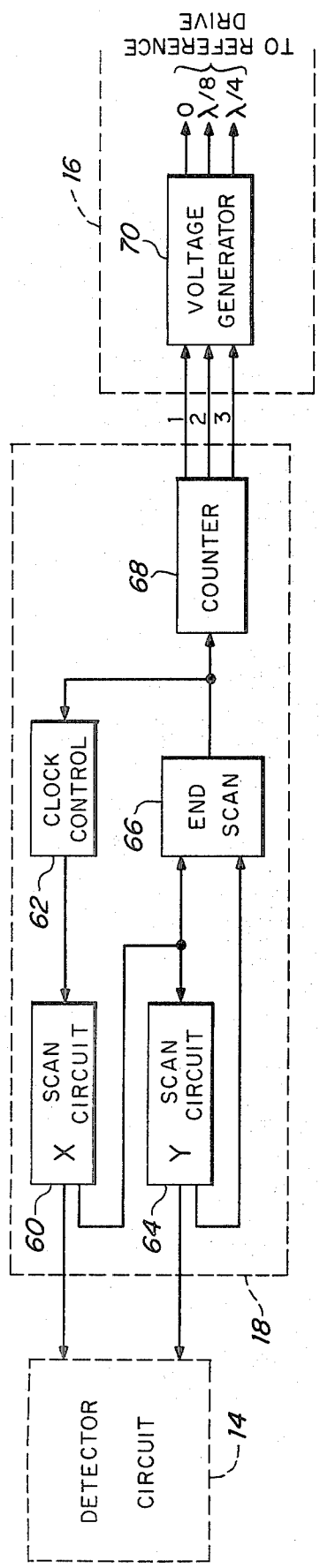
FIG. 3.
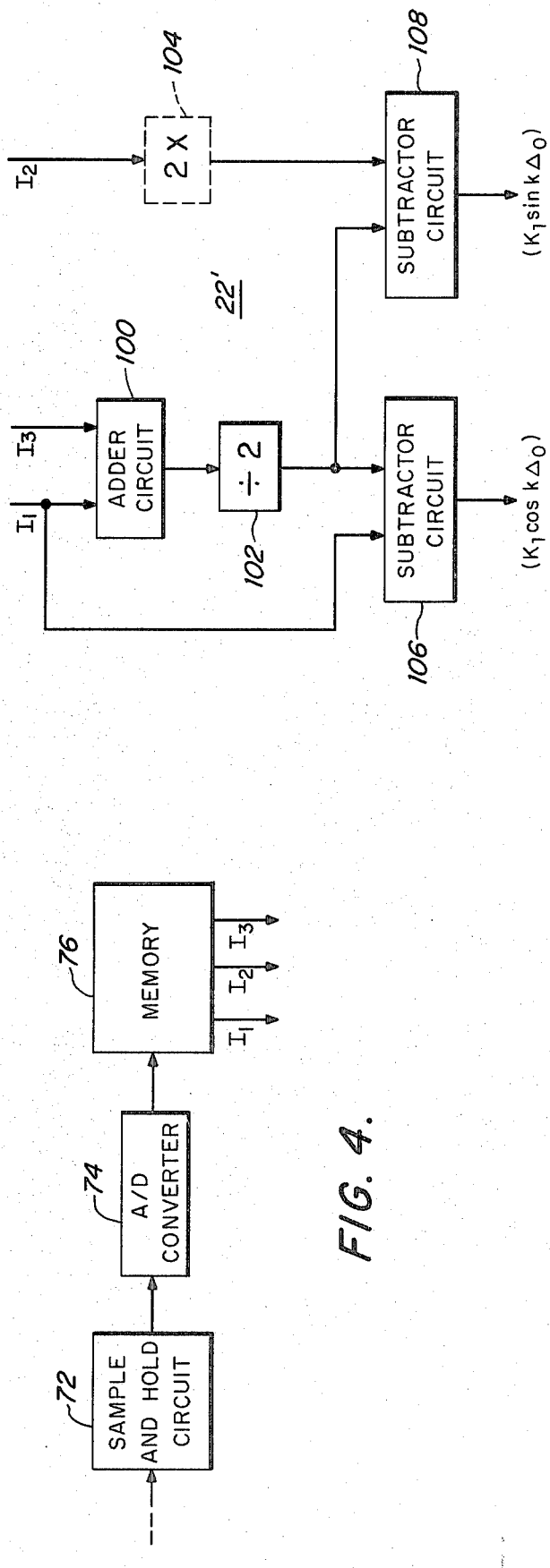
FIG. 6.
FIG. 4.

METHOD AND SYSTEM FOR DETERMINING INTERFEROMETRIC OPTICAL PATH LENGTH DIFFERENCE

FIELD OF INVENTION

This invention relates to an optical path length difference detecting interferometer method and system, and more particularly to one which uses intensity levels sensed at three different discrete optical path length differences to determine the optical path length difference between the surfaces being compared.

BACKGROUND OF INVENTION

Conventional contouring machines which determine the difference in height of points on one surface relative to a second surface typically use an interferometric device. Generally one of the surfaces is being tested against the other reference surface and the height difference is ascertained through determination of the optical path length difference between the surfaces in an interferometer. This determination is made by considering that the intensity at any point is generally represented by the expression:

$$I_o = |a_1|^2 + |a_2|^2 + 2a_1 a_2 \cos(2\pi/\lambda)\Delta \quad (1)$$

where
- $(2\pi/\lambda)\Delta$ is the phase angle $\phi$
- $\lambda$ is the wavelength of the radiation
- $\Delta$ is the difference in height of the surfaces at corresponding points.

This can be written:

$$I_o = K_o + K_1 \cos k\Delta \quad (2)$$

where:

$$K_o = |a_1|^2 + |a_2|^2$$

$$K_1 = 2a_1 a_2$$

$$k = 2\pi/\lambda$$

Applying this expression the optical path length may be varied continuously, resulting in the form $$I_o(t) = K_o + K_1 \cos k(\Delta + t) \quad (3)$$

where t is the changing path length. This term may be expanded:

$$I_o(t) = K_o + K_1 \cos k\Delta \cos kt - K_1 \sin k\Delta \sin kt \quad (4)$$

which is then subject to Fourier analysis. Performance of such analysis requires a very powerful analog computing network or special or general purpose digital computer because of the inherently complex nature of Fourier analysis. In one system over two hundred different intensities $I_o$ are sensed and must be analyzed; and this must be done for each position or spot on the surfaces to be compared. For example, an array of detectors one hundred square requires ten thousand such calculations. Thus an extremely complex task, Fourier analysis, becomes a truly brobdingnagian task used in such applications.

The Fourier analysis produces the first harmonic coefficients:

$$A_1 = K_1 \cos k\Delta \quad (5)$$

$$B_1 = K_1 \sin k\Delta \quad (6)$$

which are then used to obtain a trigonometric function of the phase angle $\phi = k\Delta$, such as:

$$B_1/A_1 = -\tan k\Delta \quad (7)$$

From this the phase angle is determined and then the difference in height of the surfaces is calculated:

$$\phi = (2\pi/\lambda)\Delta \quad (8)$$

$$\Delta = \lambda\phi/2\pi \quad (9)$$

This approach thus requires large, very powerful computing equipment which is expensive and in spite of its size and speed requires much time to complete the computations. These machines must be specially constructed or specially programmed to perform the analysis. The measurement is also time consuming in the case where over two hundred samples of the intensity are made for each position, which takes a minute or more. The extended time required for measurement leads to additional problems: vibrations taking place in the area of the machine interfere with the interferometer operations.

SUMMARY OF INVENTION

It is an object of this invention to provide an improved optical path length difference detecting system and method which greatly reduces necessary measurement and computational operations and time.

It is a further object of this invention to provide such a system and method which uses intensity levels sensed at three discrete optical path length differences to determine the path length difference.

It is a further object of this invention to provide such a system and method which uses only a few simple arithmetic operations to obtain the path length difference.

It is a further object of this invention to provide a small, compact and extremely simple optical path length difference detecting method and system which can be implemented with inexpensive, standard components.

It is a further object of this invention to provide such a system which can compute measurement operations in a tenth of a second or less and which is virtually unaffected by normal building vibrations.

The invention results from the realization that the optical path length difference between two surfaces can be determined from the intensity levels detected at only three different discrete optical path lengths at quarter wavelength intervals.

The invention features a method and a system for interferometrically determining the optical path length difference between two surfaces. The method includes varying the interferometric optical path length difference between a first and a second surface in three steps at one-quarter wavelength intervals. The interferogram radiation intensity is sensed at at least one position of the interferogram at each of the steps, and those intensities are then stored. For each of the positions, the intensity of the first and third steps is added to produce the d.c. spatial frequency amplitude. The same intensities are subtracted to obtain the cosinusoidal spatial frequency amplitude and the sinusoidal spatial frequency amplitude is obtained by subtracting from the d.c. spatial frequency amplitude the intensity of the second step. The sinusoidal and cosinusoidal amplitudes are then combined to produce a trigonometric function of the phase angle of the radiation reflected from each position of the first and second surfaces. The trigonometric function of the phase angle is used to generate an output representative of the optical path length difference at each position.

The system includes an interferometer including a radiation source of predetermined wavelength for producing an interferogram from radiation reflected from a first surface and radiation reflected from a second surface. There are means for varying the optical path length difference between the first and second surfaces in three steps at one-quarter wavelength intervals. There is at least one detector for sensing the intensity of the incident interferogram radiation and in most applications there will be an array of such detectors. There is means for scanning each of the detectors at each step to obtain a signal representative of the level of intensity at each detector. The intensity level so sensed is then stored to retain the interferogram image presented at each of the steps. There are means responsive to the storing means for determining the d.c. spatial frequency amplitude from the sum of the intensity levels derived from the first and third steps and the cosinusoidal spatial frequency amplitude from the difference between those intensities. The sinusoidal spatial frequency amplitude is determined by the difference between the d.c. spatial frequency amplitude and the intensity level derived from the second step.

There are means for combining the sinusoidal and cosinusoidal spatial frequency amplitudes to generate an amplitude representative of the trigonometric function of the phase angle of the radiation reflected from the first and second surfaces. The optical path length difference between the surfaces at each position monitored by a detector is generated from the trigonometric function of the phase angle.

The sign of the optical path length difference may be determined by comparing the d.c. amplitude to twice the intensity level at the second step and indicating that the sign is positive when the d.c. amplitude is greater, and negative when it is smaller, than the intensity level at the second step.

DISCLOSURE OF PREFERRED EMBODIMENT

Other objects, features and advantages will occur from the following description of a preferred embodiment and the accompanying drawings, in which:

FIG. 3 is a more detailed block diagram of the scanning circuit and optical path length difference control of FIG. 1;

FIG. 4 is a more detailed block diagram of the storage circuit of FIG. 1;

FIG. 6 is a block diagram of an alternative arithmetic circuit;

Figure 1:
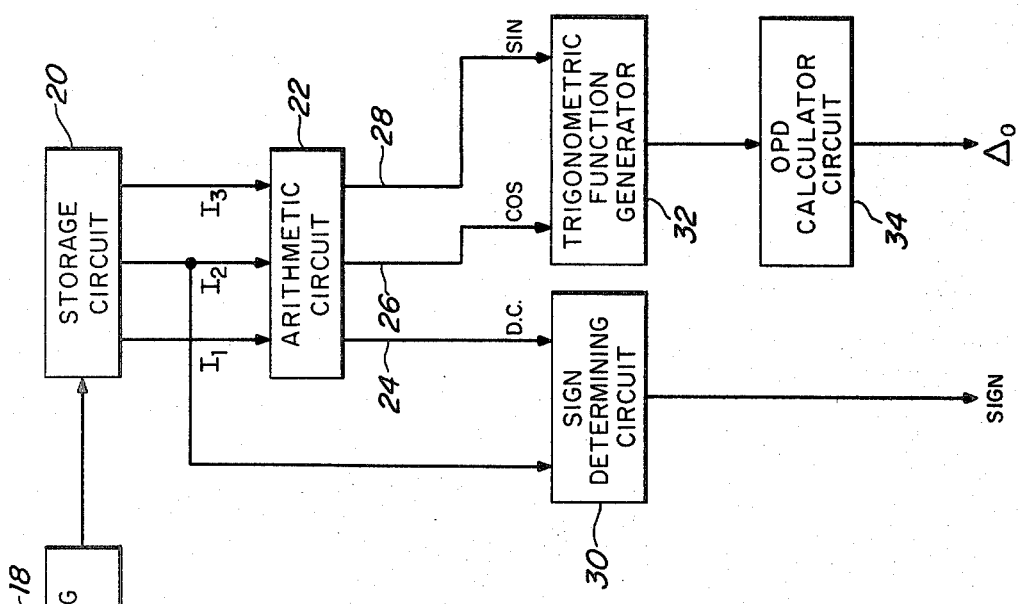
FIG. 1 is a simplified block diagram of an optical path length difference detecting interferometer system according to this invention.

The invention may be accomplished using an interferometer including a radiation source of predetermined wavelength for producing an interferogram from radiation reflected from first and second surfaces. Some means is necessary for varying the optical path length difference between the first and second surfaces by varying either one or both of the surfaces relative to each other. The optical path length difference is varied in three discrete steps at one-quarter wavelength intervals: the first or zero step; the second step at a one-quarter wavelength (90°) interval from the first step; and a third step at an additional one-quarter wavelength interval and a half wavelength (180°) from the first.

There is at least one detector for sensing the intensity of the incident interferogram radiation. More typically, there is an array of such detectors so that the process is carried out at each of the detectors immediately. For satisfactory results, the detector width is approximately one-fifth of the spacing of the fringes of the interferogram for good resolution. Each detector is scanned at each step to obtain from the detector a signal representative of the level of intensity of the interferogram at each detector. These intensity levels are stored separately for each detector for each step in order to retain the interferogram image presented at each of the steps. The means for storing may include a sample and hold circuit for receiving the scanned inputs and submitting them to an A to D converter, which then delivers them to a digital memory for subsequent processing. For each detector, the first and third intensities are combined additively to produce the d.c. spatial frequency amplitude, and differentially to produce the cosinusoidal spatial frequency amplitude. The sinusoidal spatial difference in amplitude is then found from the difference between the d.c. amplitude and the second intensity. These three amplitudes may include a constant which can be eliminated at the generation of these amplitudes or subsequently when the trigonometric function is being generated. The sign of the optical path length difference can be immediately determined by subtracting from the d.c. amplitude twice the intensity level at the second step. If the d.c. amplitude is greater, the sign is positive; if smaller, the sign is negative. This does not necessarily require a second circuit, as the sinusoidal spatial frequency amplitude is the result of that arithmetic combination and may be used as an ancillary source to determine the sign.

Once the cosinusoidal and sinusoidal spatial frequency amplitudes have been determined, they are used to generate any one of a number of trigonometric functions of the phase angle of the radiation from the first and second surfaces, e.g. sine, cosine, tan, cotan, $\sin^2$, and $\cos^2$. Subsequent to the development of a trigonometric function of the phase angle, the phase angle is specifically determined and from it the optical path length difference between the surface at each position may be simply calculated.

That this approach is sound can be seen from substituting the values 0, $\lambda/4$ and $\lambda/2$ in equation (4), supra. When $t=0$, equation (4) is simplified to:

$$I_1(t) = K_0 + K_1 \cos k\Delta_0 \quad (10)$$

when $t = \lambda/4$, to:

$$I_2(t) = K_0 - K_1 \sin k\Delta_0 \quad (11)$$

when $t = \lambda/2$, to:

$$I_3(t) = K_0 - K_1 \cos k\Delta_0 \quad (12)$$

The sum of (10) and (12)

$$I_1 + I_3 = 2K_0 \quad (13)$$

while the difference $$I_1 - I_3 = 2K_1 \cos k\Delta_0 \quad (14)$$

and the difference of (13) and (11)

$$I_1 + I_3 - I_2 = 2K_1 \sin k\Delta_0$$

The term $2K_0$ represents the d.c. spatial frequency amplitude; $2K_1 \cos k\Delta_0$ the cosinusoidal spatial frequency amplitude; and $2K_1 \sin k\Delta_0$ the sinusoidal spatial frequency amplitude. Once the cosinusoidal and sinusoidal amplitudes are obtained the generation of a trigonometric function of the phase angle $\phi$ ($k\Delta_0$) is easily made with any of a number of prior art techniques used in conjunction with the Fourier analysis approach and the value of $\Delta_0$ is calculated.

In one embodiment the system 10, FIG. 1, includes an interferometer 12 whose output interferogram is sensed by detector circuit 14. The optical path length difference between the two surfaces being compared in interferometer 12 is controlled by the optical path length difference control 16, which provides the variation in the optical path length difference in three steps at one-quarter wavelength intervals. At each of those steps, detector 14 is read out by scanning circuit 18, whose output is delivered to storage circuit 20. Each of the intensity levels derived from each of the three steps $I_1$, $I_2$, $I_3$ is delivered from storage circuit 20 to arithmetic circuit 22, which simply calculates for each detector the d.c. spatial frequency amplitude 24, the cosinusoidal spatial frequency amplitude 26 and the sinusoidal spatial frequency amplitude 28. The d.c. spatial frequency amplitude 24 is combined with the second intensity $I_2$ in the sign determining circuit 30, which determines whether the sign of the path length difference between the surfaces being compared is positive or negative, depending upon whether the d.c. amplitude is greater or less than twice the intensity level of the second step.

The cosinusoidal and sinusoidal amplitudes are combined in a trigonometric function generator 32 to provide a trigonometric function of the phase angle, which is then delivered to optical path difference calculator 34, which determines the phase angle and from it the actual optical path length difference $\Delta_0$ between the surfaces at each point monitored by a detector.

Figure 2:
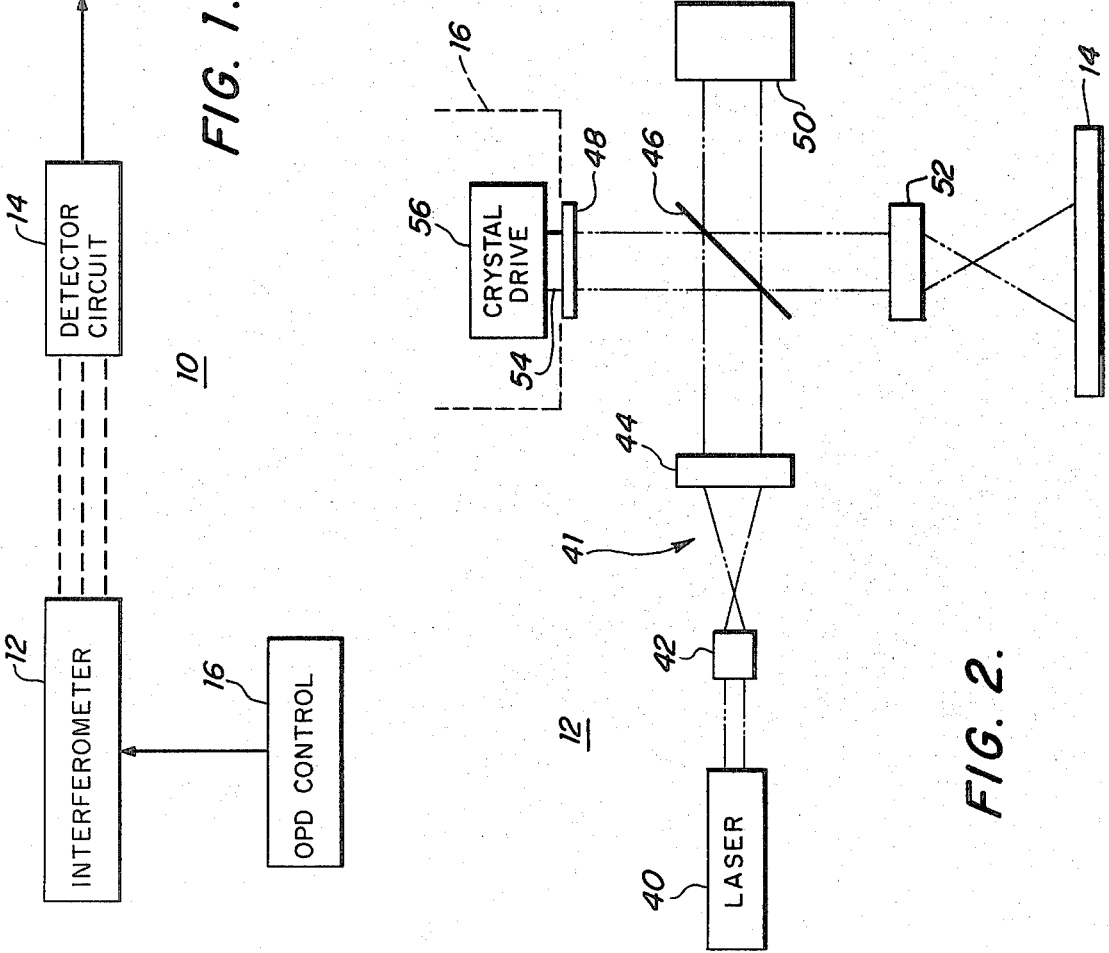
FIG. 2 is a more detailed schematic diagram of the interferometer, detector circuit and portions of the optical path length difference control of FIG. 1.

Interferometer 12 includes a laser 40, FIG. 2 which provides radiation of predetermined wavelength through beam-expanding telescope 41 including lens 42 and 44 to beam splitter 46, from which the radiation is directed to two surfaces to be compared; for example, reference surface 48 and test surface 50, which is to be evaluated against reference surface 48. The interference pattern formed by the recombination of the radiation reflected from surfaces 48 and 50 is projected by lens 52 onto detector 14, which is typically an array of detectors including a matrix of individual detectors 32 on a side, 50 on a side, or even 100 on a side. Typically surfaces 48 and 50 may be four inches square, while array 14 is but one inch square. Reference surface 48 is moved in quarter wavelength intervals by a Piezoelectric crystal 54 in optical path length difference control 16. Crystal drive 56 operates crystal 54 to provide the zero, quarter wavelength, and half wavelength interval steps by moving surface 48 one-eighth of a wavelength at the second step to obtain the overall quarter wavelength interval and by moving it a quarter wavelength and the third step to obtain the overall half wavelength interval. The halving of the motion of surface 48 is required because of the doubling factor introduced by the reflection of the radiation from its surface. Crystal 54 and crystal drive 56 may be implemented by a device such as a Burleigh PZT aligner/translator, model PZ-91, with which the first step would require no volts, the second or quarter wavelength step would require 31.64 volts, and the third or half-wavelength step would require 63.28 volts. Scanning circuit 18, FIG. 3, includes an X scan 60 driven by clock control 62, and a Y scan 64 driven by X scan 60. An end of scan circuit 66 monitors the scanning operation and counter 68 is used to initiate a step request to optical path length difference control 16. In operation, pulses from clock control 62 cause X scan 60 to read out a row of detectors in the array of detector circuit 14. At the end of a row scan, the signal from the X scan output causes Y scan 64 to step to the next row. After the Y scan has stepped to the last row, the signal is provided to end scan 66 which upon the subsequent arrival of the last scan signal from X scan 60 produces an end of scan signal which turns off clock control 62 and steps counter 68 from the first step to the second. The X scan circuit 60 and Y scan circuit 64 may be set to scan 1, 32, 50, 100, or any other number of detectors that may be contained in detector circuit 14. Voltage generator 70 in optical path length difference control 16 generates zero voltage at the first step, the one-eighth wavelength drive voltage at the second, and the one-quarter wavelength drive voltage at the third. Detector circuit 14 and portions of scanning circuit 18 may be implemented with a single device known as a solid state self-scanning image photo detector array, such as Fairchild CCD211; RCA 320X512 CED; Reticon RA-32X32A; and IPI 2D1.

Storage circuit 20 may include sample and hold circuit 72, FIG. 4, which supplies the intensity level sensed by detector circuit 14 to A to D converter 74, which converts the signals to digital form for storage in digital memory 76. Each of the three interferogram images sensed at each step by each of the detectors in detector circuit 14 is separately stored in memory 76.

Figure 5:
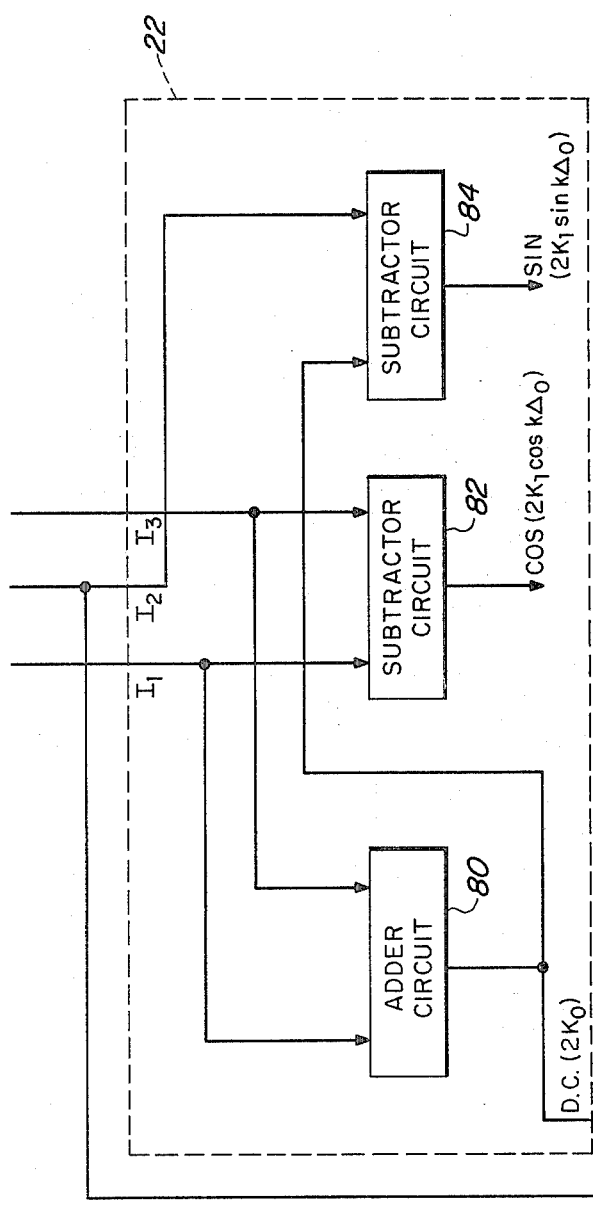
FIG. 5 is a more detailed block diagram of the arithmetic circuit of FIG. 1.
Figure 8:
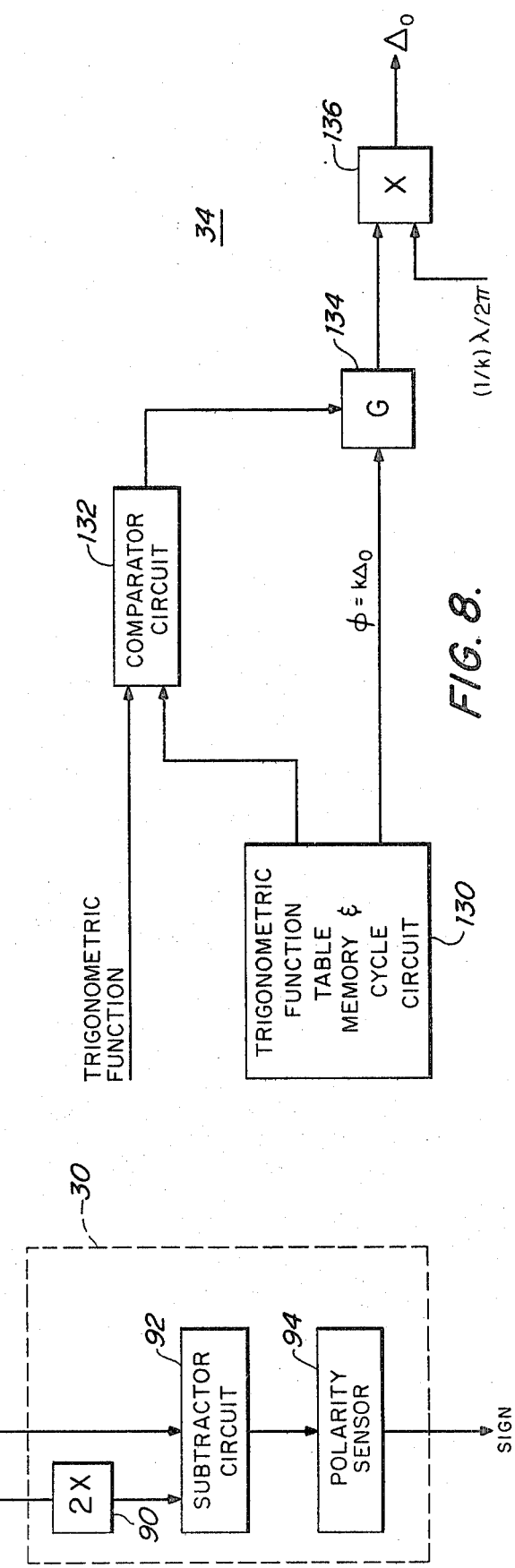
FIG. 8 is a more detailed block diagram of an implementation of the optical path length difference calculator circuit of FIG. 1.

Arithmetic circuit 22 may include simply an adder circuit 80, FIG. 5, and two subtractor circuits 82, 84. For each detector, the intensities from the first and third steps $I_1$ and $I_3$ are added by adder circuit 80 to produce the d.c. amplitude $2K_0$. The same intensities $I_1$ and $I_3$ may be subtracted in circuit 82 to provide the cosinusoidal amplitude $2K_1 \cos k\Delta_0$. The subtractor circuit 84 may subtract from the d.c. amplitude the intensity $I_2$ from the second step to produce the sinusoidal amplitude $2K_1 \sin k\Delta_0$. The cosinusoidal and sinusoidal amplitudes thus obtained may be forwarded directly to the trigonometric function generator 32. Sign determining circuit 30 may include a multiplication circuit 90 which multiplies by 2 the intensity level $I_2$ derived from the second step, and a subtractor circuit 92, which subtracts from the d.c. amplitude $(I_1+I_3)$ from adder circuit 80 the output of multiplier circuit 90, $I_2$. If the d.c. amplitude is greater than twice $I_2$, the output of subtractor circuit 92 is sensed by polarity sensor 94 to indicate a positive sign. If, conversely, the value of $2(I_2)$ is greater than the d.c. amplitude, then polarity sensor 94 indicates that the sign is negative. Alternatively, instead of providing a doubling circuit 90 in the $I_2$ input, a halving circuit could be supplied in the d.c. amplitude input from adder circuit 80.

Alternatively, arithmetic circuit 22', FIG. 6, may include adder circuit 100, divider circuit 102 or multiplier circuit 104, and two subtractor circuits 106 and 108. From this circuit the outputs $K_1 \cos k\Delta$ from subtractor circuit 106 and $K_1 \sin k\Delta$ from subtractor circuit 108 are obtained directly without the additional factor of 2, primarily from the use of divider circuit 102 which halves the input, or alternatively the multiplying circuit 104 which doubles the complementary input. As a result of this factor of 2 being removed from the arithmetic circuit, the output of subtractor circuit 108, that is $K_1 \sin k\Delta_0$ signal, may be fed directly to polarity sensor 94 to determine sign without multiplying circuit 90 and subtractor circuit 92.

Figure 7:
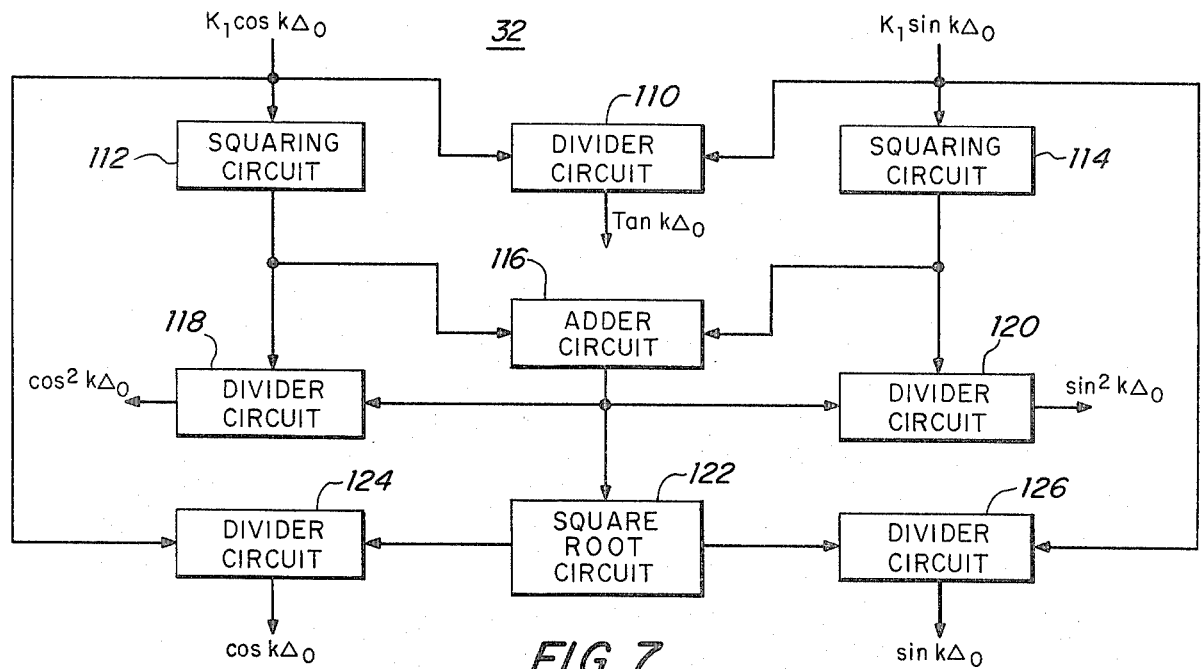
FIG. 7 is a more detailed block diagram of a multifunction implementation of the trigonometric function generator of FIG. 1.

Trigonometric function generator 32, FIG. 7, may include simply a divider circuit 110 for obtaining the trigonometric function, tangent, by simply dividing the sinusoidal amplitude $K_1 \sin k\Delta_0$ by the cosinusoidal amplitude $K_1 \cos k\Delta_0$.

Alternatively, trigonometric function generator 32 may include squaring circuit 112, squaring circuit 114, adder circuit 116, and either divider circuit 118 to obtain the trigonometric function cosine squared by dividing the square of the cosine by the sum of the squares of the sine and the cosine, or divider circuit 120 for obtaining the trigonometric function sine squared by dividing the square of the sine by the sum of the squares of the sine and the cosine.

Further, alternatively, trigonometric function generator 32 may include squaring circuits 112 and 114, adder circuit 116, square root circuit 122, and either divider circuit 124 for obtaining the trigonometric function cosine by dividing the cosine by the square root of the sum of the cosine squared and sine squared, or divider circuit 126 for obtaining the trigonometric function sine by dividing the sine by the square root of the sum of the cosine squared and sine squared.

The factor of two introduced by the arithmetic circuit 22 of FIG. 5 is removed by generator 32.

Any one of these outputs: tangent, cosine squared, sine squared, cosine, or sine, may be used in optical path length difference calculator circuit 34. The squared functions of cosine and sine are preferred since their values run only between zero and +1, making for a limited table memory requirement.

Optical path length difference calculator circuit 34 includes a trigonometric function table memory and cycle circuit 130, and comparator circuit 132 which compares the incoming trigonometric function such as cosine squared, for example, with the values of that function stored in table 130. When a match is found, comparator circuit 132 enables gate 134 to pass the corresponding phase angle $\phi$ equal to $k\Delta_0$ to multiplier circuit 136, where it is multiplied by the value of $1/k$, or $\lambda/2\pi$, to obtain the optical path length difference $\Delta_0$ between the two surfaces at the position monitored by the particular detector.

Figure 9:
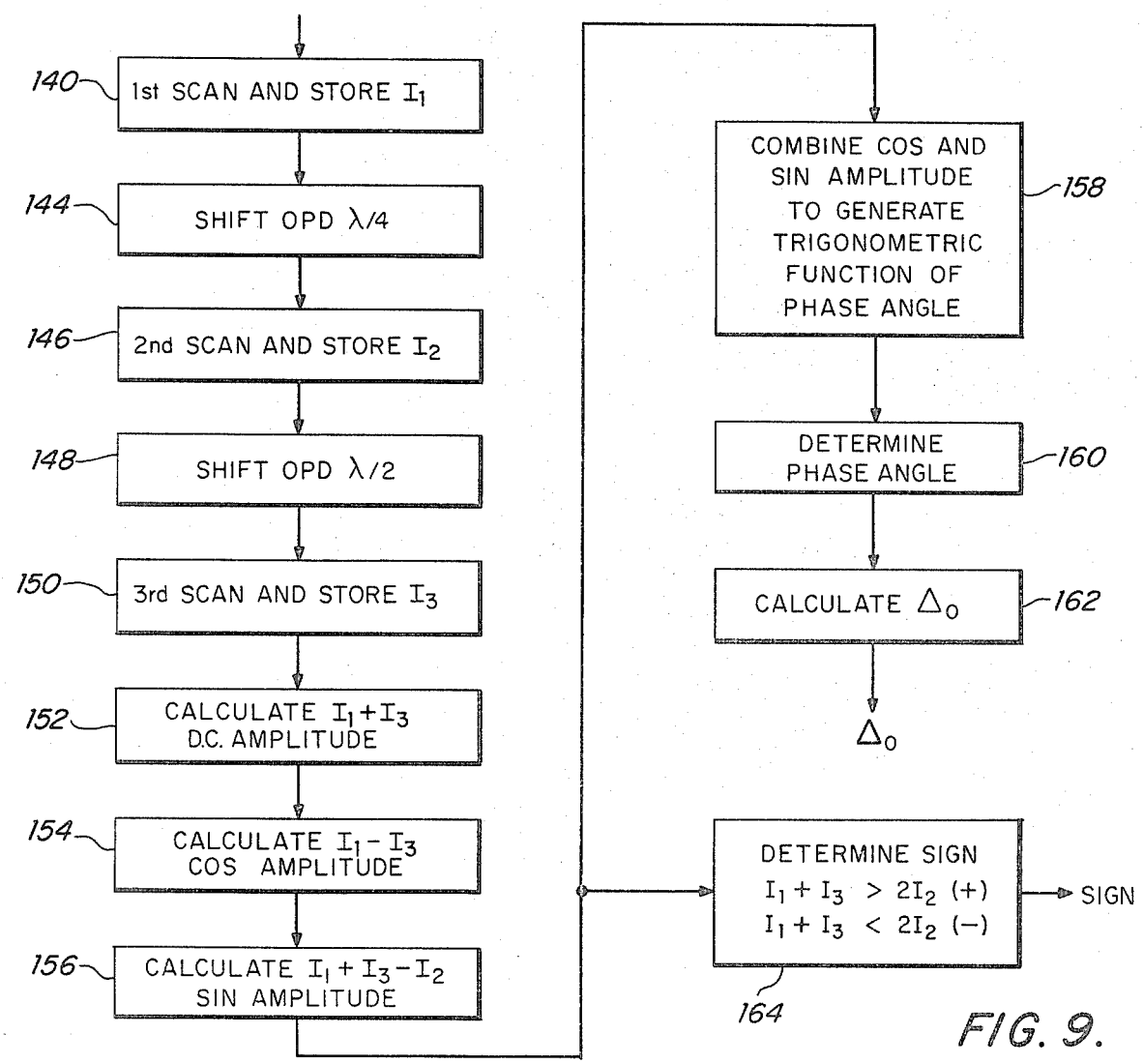
FIG. 9 is a flow chart showing the simplified method of this invention.

The method of this invention may be more easily understood from the flow diagram, FIG. 9, wherein at the first or zero step the first scan is made and the level of intensity $I_1$ is stored for each detector 140. Following this, the optical path length is shifted by one quarter wavelength 144, and the second scan and store of $I_2$ is accomplished, 146. The optical path length difference is then shifted by a quarter wavelength to obtain a total shift of a half wavelength, 148, and the third scan and store of intensity $I_3$ is accomplished, 150. Then the d.c. amplitude is calculated frm $I_1+I_3$, 152. The cosine amplitude is calculated from $I_1-I_3$, 154, and the sine amplitude is calculated from $I_1+I_3-I_2$, 156. Once this has been done, the cosine and sine amplitudes are combined to generate any particular trigonometric function of the phase angle between the interfering wave fronts, 158. This phase angle is then determined, 160, and used to calculate the optical length difference $\Delta_0$ between the surfaces at a particular detector 162. The method is carried out for each of the detectors in the detector circuit. The sign of $\Delta_0$ may be determined by comparing the d.c. amplitude term $I_1+I_3$ with twice the intensity $I_2$, 164; and if the d.c. amplitude term is greater indicating a positive sign and if it is smaller indicating a negative sign.

The operations performed by arithmetic circuit 22 in conjunction with storage circuit 20, as well as those performed by the sign-determining circuit 30, trigonometric function generator 32, and optical path length difference calculator 34, may be carried out using a micro-processor such as a an Intel-8080 or by a properly programmed digital mini-computer. The table look-up function of optical path length calculator circuit 34 may be implemented by an EPROM. Subsequent to obtaining $\Delta_0$ and the sign, these outputs may be further processed, as is known in the prior art, to detect and eliminate any tilt and tip factors between the two surfaces being compared and to ascertain the n order determination to resolve any uncertainties of $\Delta_0$ between zero and $P/2$.

Other embodiments will occur to those skilled in the art and are within the following claims:

What is claimed is:

1. An optical path length difference detecting interferometer system comprising:
   an interferometer including a radiation source of predetermined wavelength for producing an interferogram from radiation reflected from a first surface and radiation reflected from a second surface;
   means for varying the optical path length difference between said first and second surfaces in three steps at one quarter wavelength intervals;
   at least one detector for sensing the intensity of the incident interferogram radiation;
   means for scanning each said detector at each step to obtain from each detector a signal representative of the level of intensity at each detector;
   means for storing each intensity level derived from each detector to retain the interferogram image presented at each of said steps;
   means responsive to said storing means for determining the d.c. spatial frequency amplitude from the sum of the intensity levels derived from the first and third steps; for determining the cosinusoidal spatial frequency amplitude from the difference between the intensity levels derived from the first and third steps and for determining the sinusoidal spatial frequency amplitude from the difference between said d.c. spatial frequency amplitude and intensity level derived from the second step;

means for combining said sinusoidal and cosinusoidal spatial frequency amplitudes to generate an amplitude representative of a trigonometric function of the phase angle of the radiation reflected from the first and second surfaces; and means, responsive to said amplitude representative of a trigonometric function of the phase angle, for generating an output representative of the optical path length difference between said surfaces at each position monitored by a said detector.

2. The system of claim 1 further including means for comparing the d.c. spatial frequency amplitude to twice the intensity level at the second step; and means responsive to the former being greater than the latter, for indicating that the sign of the optical path length difference is positive and responsive to the converse for indicating that the difference is negative.

3. The system of claim 1 in which said means for storing includes means for converting from analog to digital signals said signals representative of levels of intensity from said means for scanning.

4. The system of claim 1 in which said means for determining the d.c. spatial frequency amplitude includes means for adding, and said means for determining the cosinusoidal and sinusoidal spatial frequency amplitude each includes means for subtracting.

5. The system of claim 1 in which said means for combining includes means for dividing said sinusoidal by said cosinusoidal spatial frequency amplitude and said trigonometric function produced is the tangent.

6. The system of claim 1 in which said means for combining includes means for squaring said cosinusoidal amplitude, means for squaring said sinusoidal amplitude, and means for adding the squared cosinusoidal and sinusoidal amplitudes.

7. The system of claim 6 in which said means for combining further includes means for dividing said cosinusoidal amplitude squared by the sum of the squares of said cosinusoidal and sinusoidal amplitudes and the trigonometric function produced is the cosine squared.

8. The system of claim 6 in which said means for combining further includes means for dividing said sinusoidal amplitude squared by the sum of the squares of said cosinusoidal and sinusoidal amplitudes and the trigonometric function produced is the sine squared.

9. The system of claim 6 in which said means for combining further includes means for producing the square root of the sum of the squares of the cosinusoidal and sinusoidal amplitudes.

10. The system of claim 9 in which said means for combining further includes means for dividing said cosinusoidal amplitude by the square root of the sum of the squares of said cosinusoidal and sinusoidal amplitudes and said trigonometric function produced is cosine.

11. The system of claim 9 in which said means for combining further includes means for dividing said sinusoidal amplitude by the square root of the sum of the squares of said consinusoidal and sinusoidal amplitudes and said trigonometric function produced is sine.

12. The system of claim 1 in which said means for generating includes means for storing a table of trigonometric functions, means for comparing the generated trigonometric function with said table of functions, to determine the phase angle; and means for combining that phase angle with the ratio of $2\pi$/wavelength to generate the optical path length difference.

13. A method of determining interferometric optical path length difference comprising:

varying the interferometric optical path length difference between a first and a second surface in three steps at one quarter wavelength intervals;

sensing the intensity of the interferogram radiation at at least one position of the interferogram at each of said steps;

storing the intensity sensed at each position at each step;

for each of said positions, adding the intensity at the first and third steps to produce the d.c spatial frequency amplitude, subtracting the intensity at the third step from that at the first to obtain the cosinusoidal spatial frequency amplitude and subtracting the intensity at the second step from the d.c. amplitude to produce the sinusoidal spatial frequency amplitude;

combining the sinusoidal and cosinusoidal amplitudes to produce a trigonometric function of the phase angle of the radiation reflected from each position of the first and second surfaces; and generating from the trigonometric function of the phase angle an output representative of the optical path length difference at each position.

14. The method of claim 13 further including comparing the d.c. amplitude to twice the intensity level at the second step; and indicating that the sign of the optical path length difference is positive when the former is greater and negative when it is smaller.

* * * * *